March 27, 1962  D. L. MOORE  3,026,979
SPEED-TORQUE METERING UNIT
Filed July 30, 1959  4 Sheets-Sheet 1

INVENTOR
DAVID L. MOORE

BY  KARL W. FLOCKS
ATTORNEY

March 27, 1962 D. L. MOORE 3,026,979
SPEED-TORQUE METERING UNIT
Filed July 30, 1959 4 Sheets-Sheet 2
Fig. 2.
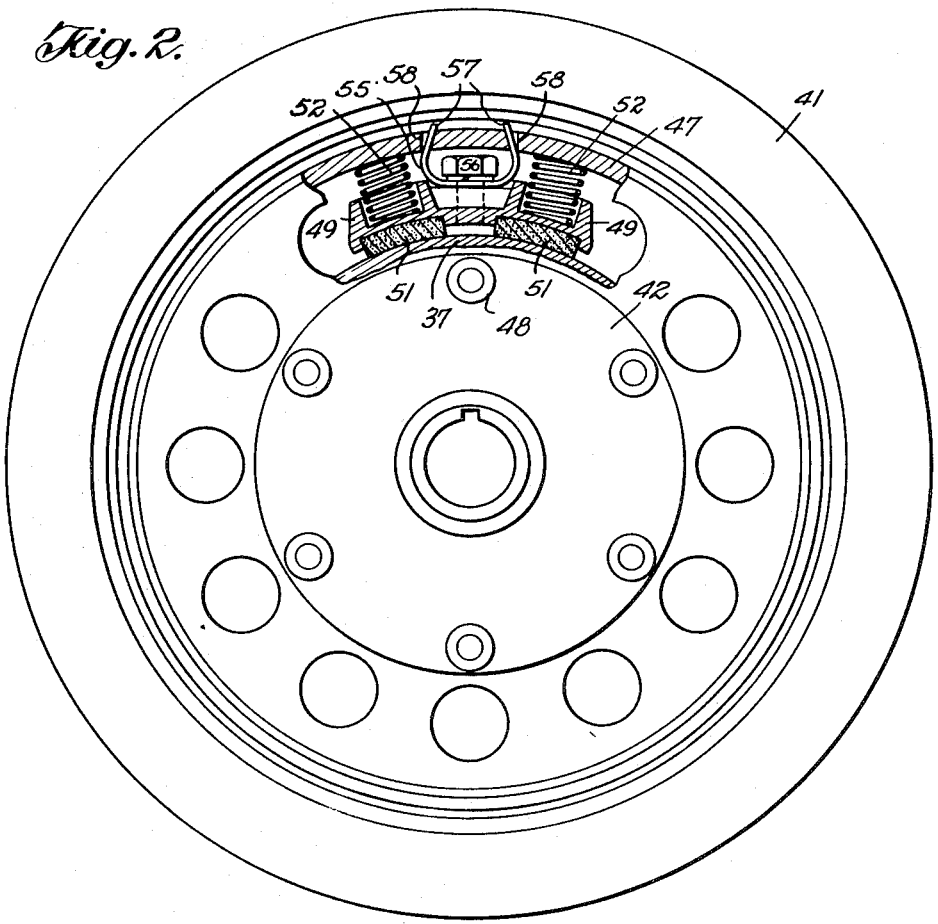
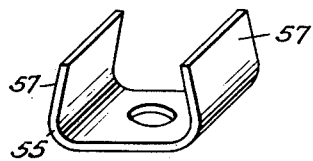
Fig. 3.
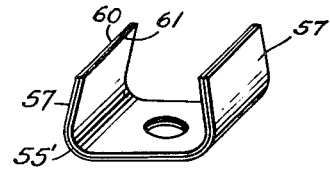
Fig. 4.
INVENTOR
DAVID L. MOORE
BY KARL W. FLOCKS
ATTORNEY March 27, 1962  D. L. MOORE  3,026,979
SPEED-TORQUE METERING UNIT
Filed July 30, 1959  4 Sheets-Sheet 4

INVENTOR
DAVID L. MOORE

BY  KARL W. FLOCKS
ATTORNEY

United States Patent Office 3,026,979
Patented Mar. 27, 1962

3,026,979
SPEED-TORQUE METERING UNIT
David L. Moore, De Witt, N.Y., assignor to Lipe-Rollway Corporation, Syracuse, N.Y., a corporation of New York
Filed July 30, 1959, Ser. No. 830,638
7 Claims. (Cl. 192—104)

The present invention relates to a speed-torque metering unit, and more particularly to such a unit in which a resilient, and possibly thermally responsive, torque transfer agent transfers torque between the driven shoes of the unit and the driven drum of the unit, and to a speed-torque metering unit which is so constructed that the output shaft thereof constitutes a main supporting element of the unit.

Speed-torque metering units are known in which a driving drum is spaced concentrically from and within a driven drum, there being spring-urged friction shoes in the space between the two drums and in normal engagement with the driving drum. The friction shoes are urged outwardly against the springs under the influence of centrifugal force to thus reduce the force of the engagement of the friction shoes against the driving drum. These speed-torque metering units have found considerable application in automotive equipment, and are used in the power train between the main automobile engine and a driven accessory, such as the automobile fan. Their use has come about because at high speeds it is desirable to transmit little or no torque to some of the automobile engine accessories, and with a straight transmission such as the ordinary V-belt there is a tendency to operate the driven accessories at too high a speed. Otherwise stated, while it is desirable to drive these accessories at low engine speeds, it is often important that these accessories are not driven at ever increasing speeds as the speed of the engine is increased.

While the known speed-torque metering units have performed well where they have been required to transmit relatively low torque values, such as are generated by passenger car engines, or even by ordinary truck engines, these units have not heretofore been capable of use in connection with engines of higher torque output, such as those used in heavy duty trucks and earth moving equipment.

Further, these speed-torque metering units have in general been mounted upon the engine block directly, and while this has proven satisfactory where these units have been used on the ordinary automobile or truck engines, other engine configurations do not provide for the mounting of the unit directly thereon. Hence, the problem of mounting of the unit has restricted the use of the unit to certain types of engines and these units have not, heretofore, been amenable to mounting on other types of engines.

In addition, where these units have been put under great load at relatively low regions of their speed range, there has resulted much slippage of the friction shoes on the driving drum, with attendant losses due to heat horsepower. The heat was dissipated and in some instances where a thermally responsive element has been used in connection with a speed-torque metering unit, efforts have been made to prevent the transfer of the heat to these thermally responsive elements.

An object of the present invention is to provide a speed-torque metering unit capable of transmitting a relatively high torque.

Another object of the present invention is the provision of a speed-torque metering unit in which the output shaft constitutes a main support for the unit.

A further object of the present invention is to provide a speed-torque metering unit which does not need to be mounted directly to an engine.

Another object of the present invention is to provide a speed-torque metering unit in which slippage is reduced in order to effect greater relative torque transmission.

Yet another object of the present invention is the provision of a speed-torque metering unit in which slippage is sensed and reduced to effect a high torque transmission.

A still further object of the present invention is to provide a speed-torque metering unit in which a thermally responsive element is caused to expand by the heat generated from slippage in order to compensate for and to counteract the slippage of the unit.

Another object of the present invention is the provision of a speed-torque metering unit in which a resilient member is utilized for torque transmission, which member is guarded against a permanent deformation.

Other objects and the nature and advantages of the instant invention will be apparent from the following description taken in conjunction with the accompanying drawings, wherein:

FIG. 2 is a view taken looking in the direction of the arrows 2—2 of FIG. 1.

FIG. 3 is a perspective view of a torque transfer member forming a part of the speed-torque metering unit of the present invention.

FIG. 4 is a perspective view of another torque transfer member.

Figure 1:
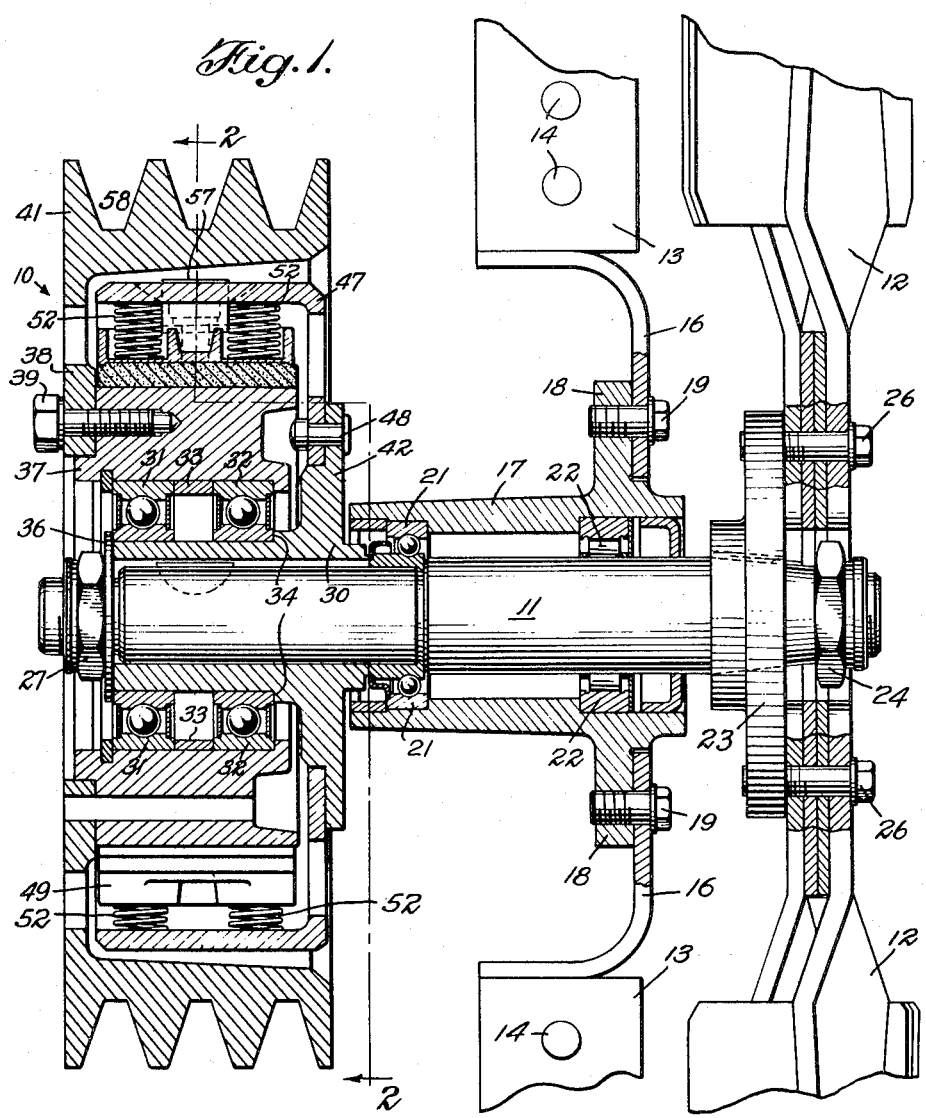
FIG. 1 is a longitudinal cross section of a speed-torque metering unit and fan, and showing the mounting thereof.

Referring now to the drawings, wherein like reference numerals are used to designate like or corresponding parts throughout the several views, there is shown in FIG. 1 a speed-torque metering unit 10 having an output shaft 11 to which is connected a fan 12. A bracket 13 is attached to an engine (not shown) by the bolts 14 and has an extension 16. A tubular support 17 having a flange 18 is secured to the extension 16 by means of the bolts 19, only one of which is shown.

The tubular support 17 has a bearing 21 of the ball type seated adjacent one end thereof and a bearing 22 of the roller type seated adjacent the other end thereof, these bearings being retained in the tubular support 17 by retaining elements in known fashion. The output shaft 11 is journaled in the bearings 21 and 22 and extends beyond the tubular support 17 at both ends thereof. At the right-hand end, as seen in FIG. 1, a mounting hub 23 is keyed to the output shaft 11 and is secured thereon by the nut 24. The fan 12 is bolted to the flange of the hub 23 by bolts 26. A driven hub 20 is keyed to the other end of the shaft 11 and secured thereto by a nut 27 that is on the threaded end of the shaft 11. A driven hub 30 is keyed on the shaft 11 and has thereon a pair of ball bearings 31 and 32 that are separated by a spacer member 33 and held against axial displacement along the hub 30 by a shoulder 34 on the hub 30 and a plate 36 that is engaged by the nut 27. The bearings 31 and 32 rotatably support a driving drum 37 that is secured to a driving disc 38 by the bolts 39, and has a multi-grooved sheave 41 integral therewith. A plurality of V-belts, not shown, engage with the grooves of the sheave 41 and also in the grooves of a similar sheave that is driven by the crankshaft of the engine.

The driven hub 30 has an attaching disc 42 integral therewith, and a driven drum 47 is secured thereto as by the rivets 48. The driven drum 47 is in outwardly spaced concentric relationship with the driving drum 37, and in the annular space thus provided are a plurality of friction shoes 49, each of which comprises two blocks 51 of friction material, and each of which is urged against the driving drum 37 by four springs 52. As is best seen in FIG. 2, a member 55 is secured to the friction shoe 49 by a bolt 56. Referring to FIG. 3, the member 55 has a pair of fingers 57, and these fingers may be seen in FIG. 2 to extend outwardly and obliquely through apertures 58 in the driven drum 47. The sides of the fingers 57 are in engagement with the margins of the apertures 58.

In one embodiment of the invention, the member 55 is made of resilient material such as spring steel. In another embodiment of the invention the member 55' is bimetallic, as shown in FIG. 4, and thus is made of the two parts 60 and 61 which are of metals having different coefficients of expansion. The member 55' shown in FIG. 4 is also resilient, and is of the same shape externally as the member 55 shown in FIG. 3.

In operation, the speed-torque metering unit 10 is mounted as shown in the drawings from the bracket 13 that is bolted to the engine. The entire unit 10 is supported on the output shaft 11 which is in turn journaled in the tubular support 17 that is connected to the bracket 13. When the sheave 41 is caused to rotate, the driving disc 38 will cause rotation of the driving drum 37, and the driving drum 37 will rotate with respect to the driven hub 30 by virtue of the bearings 31 and 32. The springs 52 will urge the friction shoes 49, and particularly the blocks 51 thereof, into engagement with the surface of driving drum 37, and thus the friction shoes 49 will rotate with the driving drum 37 (under certain conditions). Torque will be transferred from the friction shoes 49 to the driven drum 47 by means of the member 55. In particular, the torque will be transferred by the sides of the fingers 57 acting against one or the other edges of the aperture 58 in the driven drum 47. Rotation of driven drum 47 will cause the attaching disc 42 and the driven hub 30 to rotate, and because of the keyed connection between the driven hub 30 and the shaft 11, the latter will also rotate to turn the fan 12.

Where the torque transfer member 55 is made of a resilient material, such as spring steel, the unit 10 will be capable of transmitting relatively high torque, it being noted that the resilient fingers 57 of the members 55 will yield somewhat under load to cushion any "shock" effects that may be generated. Also, by virtue of the oblique direction of the fingers 57, as the friction shoes 49 are urged outwardly by centrifugal force, the fingers 57 of the members 55 will yield as necessary to accommodate the new position of the friction shoe 49.

Where the member 55' of FIG. 4 is used, which member is bimetallic and consequently thermally responsive, it will function in general as above described in connection with the resilient member 55 shown in FIG. 3, since the bimetallic member 55' of FIG. 4 is also resilient. In addition, however, as a high load is imposed on the output shaft of the unit, thus tending to restrain the driven drum 47, and/or the driving drum 37 revolves at such high speeds that the spring forces urging the friction shoe into engagement therewith are overcome, resulting in slippage between the friction shoes 49 and the driving drum 37, heat will be generated. This heat flows, in part, through the friction blocks 51, into the metal material of the friction shoes 49 and thence into the member 55' of FIG. 4. As the member 55' of FIG. 4 is heated thereby, it expands and urges the friction shoe 49 towards tighter engagement with the driving drum 37. This reduces the slippage, and consequently serves to counteract the slippage and the consequent generation of heat. Thus, the member 55' of FIG. 4 may be seen to counteract the slippage of the unit and to permit the unit to transfer more torque than would otherwise be the case.

In the embodiment of the invention shown in FIGS. 5 to 7, and referring particularly to FIG. 5, there may be seen a speed-torque metering unit 70 that is generally similar to the speed-torque metering unit 10 shown in FIGS. 1 to 4; those parts of unit 70 which correspond to parts in unit 10 have been designated by the same reference numerals, and the units are structurally and functionally the same except as noted hereinbelow.

Figure 7:
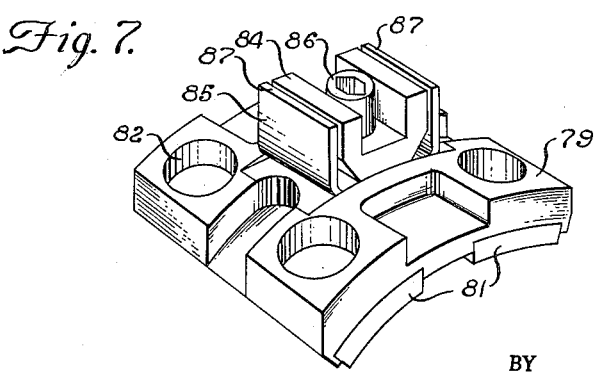
FIG. 7 is a perspective view of a friction shoe and torque transfer member assembly of the present invention.

Referring first to FIG. 7, there is shown a friction shoe 79 having two blocks 81 of friction material on the lower or inner surface thereof. Friction shoe 79 has four spaced recesses 82 for receiving springs. Into the midportion of the friction shoe 79 there is screwed a bolt 86 that serves to secure to the friction shoe 79 a stop block 84 and a spring member 85, which latter is generally similar to the member 55 shown in FIG. 3 but differs therefrom in that the fingers 87 thereof are not inclined toward each other. Instead, the fingers 87 of member 85 are slightly outwardly inclined with respect to each other. The block 84 is between and closely adjacent the fingers 87.

Figure 5:
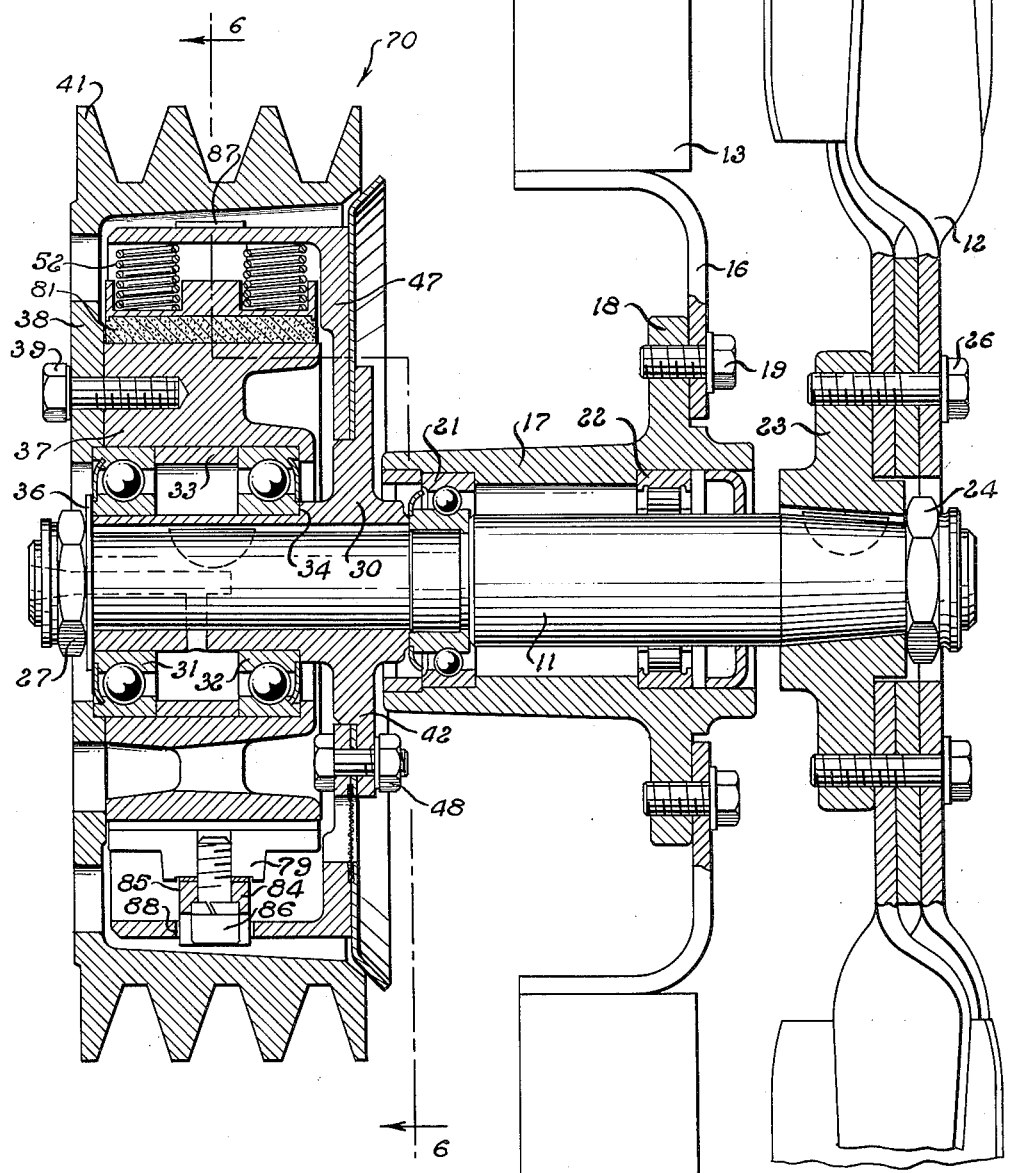
FIG. 5 is a longitudinal cross-sectional view of another embodiment of the present invention.
Figure 6:
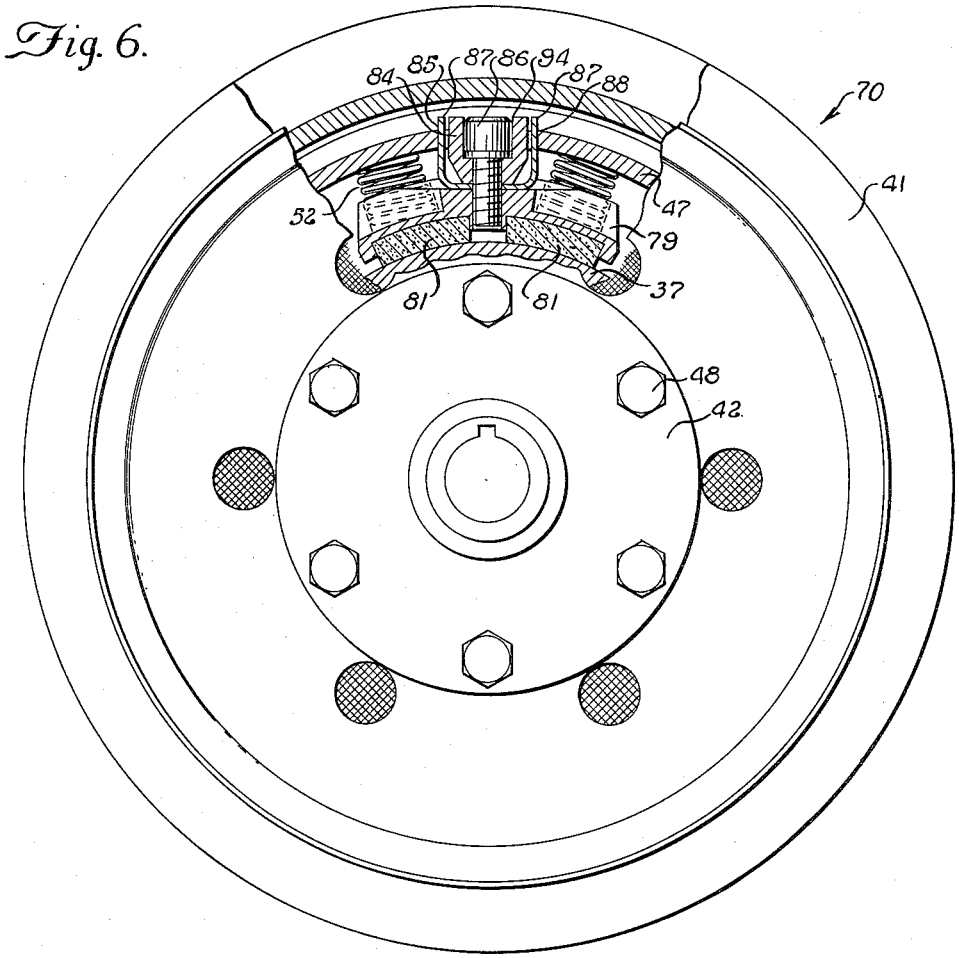
FIG. 6 is a partial cross-sectional view taken on the line 6—6 of FIG. 5.

In FIGS. 5 and 6, it may be seen that driven drum 47 has a relatively large opening 88 therein to receive the two fingers 87 of member 85, with the block 84 therebetween. In FIG. 6 the fingers 87 are shown bearing against the edges of the opening 88 in driven drum 47 with the sides of block 84 closely adjacent the inner surfaces of these fingers 87. The block 84 has a recess 94 therein which receives the head of bolt 86, and the bolt 86 being threaded into friction shoe 79 clamps the block 84 and the member 85 to the friction shoe 79.

In operation, the unit 70 of FIGS. 5, 6 and 7 will have the driving drum 37 thereof rotated, and drum 37 will in turn tend to rotate the friction shoes 79. Since the outer surface of one of the fingers 87 is in contact with a side of opening 88 of driven drum 47, torque will be transmitted from the driving drum 37 to the driven drum 47 through the friction shoes 79 and the fingers 87. Where there is a strong resistance by the driven device imposed upon the driving drum 37 by the driven drum 47, a finger 87 of spring member 85 will yield, and this will occur particularly during the critical stages of operation of the device. This action of the spring member 85 will enable the unit 70 to start and to operate without undue shock. However, should the resistance of the driven drum 47 become too great, the finger 87 will abut against stop block 84, and thus will not be excessively strained, or receive a permanent deformation.

There has been provided a speed-torque metering unit that is capable of transmitting a relatively great amount of torque, this unit accomplishing this by the provision of a torque transfer member which is attached to the friction shoes of the unit and which is in engagement with the driven drum of the unit. The torque transfer member is resilient, and may in addition be thermally responsive, as by being made of a bimetallic material. Where the bimetallic torque transfer member is utilized, it serves to counteract or compensate for slippage of the unit and thus effects the transmission of a greater amount of torque than has heretofore been possible.

The invention hereinabove described also provides for safeguarding a resilient torque transfer member in a speed-torque metering unit against overstressing, and provides for virtually shockless engagement.

There has also been provided a speed-torque metering unit that is so constructed that it need not be mounted directly upon an engine, but may instead be mounted by its output shaft to a bracket that is in turn secured to a support, such as the engine.

It will be obvious to those skilled in the art that various changes may be made without departing from the spirit of the invention and therefore the invention is not

What is claimed is:
1. A torque transmitting device comprising a tubular support adapted to be secured to an engine, a shaft journaled in and extending through said tubular support and adapted to have a fan secured to one end thereof, a driven hub secured on the other end of said shaft, an attaching disc on said hub, a driven drum secured to said attaching disc, a driving drum in inwardly spaced concentric relation to said driven drum and journaled on said hub, a driving sheave on said driving drum, said sheave being in outwardly spaced concentric relation to said driven drum, friction shoes in the space between said driving and driven drums and mounted for engagement with said driving drum, spring means urging said friction shoes into engagement with said driven drum, a resilient torque transfer member secured to each of said shoes and having a pair of resilient fingers extending outwardly, said fingers being slightly outwardly inclined with respect to each other, a stop block carried by each said shoe and positioned between said fingers, said block including abutting surfaces spaced from opposed surfaces of said fingers and closely adjacent thereto, a plurality of radially disposed apertures in said driven drum, the fingers of each of said torque transfer members and the stop block therebetween extending through one of the apertures with the outer sides of the fingers in engagement with the aperture-defining margins of said driven drum and the stop block spaced therefrom, whereby torque is transferred to said driven drum by said resilient torque transfer member and the stop blocks prevent excessive deformation of the resilient torque transmitting member fingers.

2. A torque transmitting device comprising a driven hub, an attaching disc on said hub, a driven drum secured to said attaching disc, a driving drum in inwardly spaced concentric relation to said driven drum and journaled on said hub, a driving sheave on said driving drum, said sheave being in outwardly spaced concentric relation to said driven drum, friction shoes in the space between said driving and driven drums and mounted for engagement with said driving drum, spring means urging said friction shoes into engagement with said driving drum and being in engagement with said driven drum, a resilient torque transfer member secured to each of said shoes and having a pair of resilient fingers extending outwardly in diverging relationship with respect to each other, a stop block carried by each said shoe and positioned between said fingers, said block including abutment surfaces spaced from opposed surfaces of said fingers and closely adjacent thereto, a plurality of radially disposed apertures in said driven drum, the fingers of each of said torque transfer members and the stop block therebetween extending through one of the apertures with the outer sides of the fingers in engagement with the aperture-defining margins of said driven drum and the stop block spaced therefrom, whereby torque is transferred to said driven drum by said resilient torque transfer member and the stop blocks preventing excessive deformation of the resilient torque transfer member fingers.

3. A torque transmitting device comprising a driven hub, a driven drum secured in spaced concentric relation to said driven hub, a driving drum in inwardly spaced concentric relation to said driven drum and journaled on said hub, a driving disc secured to sheave on said driving drum, said sheave being in outwardly spaced concentric relation to said driven drum, friction shoes in the space between said driving and driven drums and mounted for engagement with said driving drum, spring means urging said friction shoes into engagement with said driving drum and being in engagement with said driven drum, a resilient torque transfer member secured to each of said shoes and having a pair of resilient fingers extending outwardly in diverging relationship with respect to each other, a stop block carried by each said shoe and positioned between said fingers, said block including abutment surfaces spaced from opposed inner surfaces of said fingers and closely adjacent thereto, a plurality of apertures in said driven drum, the fingers of each of said torque transfer members and the stop block therebetween extending through one of the apertures with the outer sides of the fingers in engagement with the aperture-defining margins of said driven drum and the stop block spaced therefrom, whereby torque is transferred to said driven drum by said resilient torque transfer member and the stop blocks preventing excessive deformation of the resilient torque transfer member fingers.

4. A torque transmitting device comprising a driven hub, a driven drum secured in spaced concentric relation to said driven hub, a driving drum in inwardly spaced concentric relation to said driven drum and journaled on said hub, means to rotate said driving drum, friction shoes in the space between said driving and driven drums and mounted for engagement with said driving drum, spring means urging said friction shoes into engagement with said driving drum and being in engagement with said driven drum, a resilient torque transfer member secured to each of said shoes and having a pair of resilient fingers extending outwardly in diverging relationship with respect to each other, a stop block carried by each said shoe and positioned between said fingers, said block including abutment surfaces spaced from opposed inner surfaces of said fingers and closely adjacent thereto, a plurality of radially disposed apertures in said driven drum, the fingers of each of said torque transfer members and the stop block therebetween extending through one of the apertures with the outer sides of the fingers in engagement with the aperture-defining margins of said driven drum and the stop block spaced therefrom, whereby torque is transferred to said driven drum by said resilient torque transfer member and the stop blocks preventing excessive deformation of the resilient torque transfer member fingers.

5. A torque transmitting device comprising a driven drum, means mounting said driven drum for rotation, a driving drum in inwardly spaced concentric relation to said driven drum, means mounting said driving drum for rotation, friction shoes in the space between said driving and driven drums and mounted for engagement with said driving drum, spring means urging said friction shoes into engagement with said driving drum and being in engagement with said driven drum, a resilient torque transfer member secured to each of said shoes and having a pair of resilient fingers extending in diverging relationship with respect to each other, a stop block carried by each said shoe and positioned between said fingers, said block including abutment surfaces spaced from opposed inner surfaces of said fingers and closely adjacent thereto, a plurality of radially disposed apertures in said driven drum, the fingers of each of said torque transfer members and the stop block extending through one of the apertures with the outer sides of the fingers in engagement with the aperture-defining margins of said driven drum and the stop block spaced therefrom, whereby torque is transferred to said driven drum by said resilient torque transfer member and the stop blocks preventing excessive deformation of the resilient torque transfer member fingers.

6. A torque transmitting device comprising a driven drum, means mounting said driven drum for rotation, a driving drum in inwardly spaced concentric relation to said driven drum, means mounting said driving drum for rotation, friction shoes in the space between said driving and driven drums and mounted for engagement with said driving drum, spring means urging said friction shoes into engagement with said driven drum, a resilient torque transfer member secured to each of said shoes and having a pair of resilient fingers in diverging relationship with respect to each other, a stop block carried by each said shoe and positioned between said fingers, said block including abutment surfaces spaced from opposed inner surfaces of said fingers and closely adjacent thereto, engaging means on said driven drum, the outer sides of the fingers of said torque transfer member being in contact with said engaging means with opposed surfaces of said stop block being spaced therefrom, whereby torque is transferred to said driven drum by said resilient torque transfer member and the stop blocks preventing excessive deformation of the resilient torque transfer member fingers.

7. A torque transmitting device comprising a driven drum, means mounting said driven drum for rotation, a driving drum in inwardly spaced concentric relation to said driven drum, means mounting said driving drum for rotation, friction shoes in the space between said driving and driven drums and mounted for engagement with said driving drum, spring means urging said friction shoes into engagement with said driving drum and being in engagement with said driven drum, a torque transfer member secured to each of said shoes and having finger means diverging outwardly with respect to each other and resiliently connected thereto, a stop block carried by each said shoe and positioned between and closely adjacent to the fingers of the torque transfer member of the friction shoe, engaging means on said driven drum, the finger means of said torque transfer member including opposed outer surfaces in contact with said engaging means with the opposed outer surfaces of said stop block being spaced from said engaging means, whereby torque is transferred to said driven drum by said resilient torque transfer member and the stop blocks preventing excessive deformation of said torque transfer member fingers.

References Cited in the file of this patent

UNITED STATES PATENTS

| 1,610,844 | Banner | Dec. 14, 1926 |
| 1,842,039 | Matthews | Jan. 19, 1932 |
| 2,506,520 | Spase | May 2, 1950 |
| 2,762,482 | Davis | Sept. 11, 1956 |
| 2,855,079 | Spase | Oct. 7, 1958 |
| 2,863,543 | Spase | Dec. 9, 1958 |

FOREIGN PATENTS

| 177,071 | Germany | Oct. 25, 1906 |
| 292,793 | Germany | June 28, 1916 |